United States Patent [19]
Holman

[11] 3,799,336
[45] Mar. 26, 1974

[54] METHOD AND APPARATUS FOR TREATING DISCRETE ARTICLES

[75] Inventor: Lee B. Holman, Whittier, Calif.
[73] Assignee: Standun, Inc., City of Industry, Calif.
[22] Filed: Nov. 3, 1972
[21] Appl. No.: 303,498

[52] U.S. Cl. .................................. 209/85, 209/99
[51] Int. Cl. ........................................ B07b 13/04
[58] Field of Search ........... 209/85, 99, 107, 83, 73, 209/75

[56] References Cited
UNITED STATES PATENTS
3,682,301   8/1972   Ross .................................... 209/85

*Primary Examiner*—Allen N. Knowles
*Attorney, Agent, or Firm*—Edward F. Jaros

[57] ABSTRACT

A method and apparatus for using a vibratory type conveyor means for processing discrete articles, for example elongated articles or produce, including grading the articles by length. Readily removable and adjustable tray means are carried by the conveyor means in spaced relation to a bottom wall of the conveyor means, the tray means comprising a plurality of tray sections of selected configuration and design depending upon the treatment of the article. Tray sections are designed to longitudinally orient elongated articles, certain of said tray sections having their trailing discharge edges spaced longitudinally and vertically from the adjacent end portion of the succeeding tray section. The tray section is provided with longitudinally extending fingers to span the space between adjacent ends of tray sections for retaining orientation of those articles which pass over said space, permitting articles of less than a selected length to fall to the conveyor wall there beneath for separation purposes. A tray means including a plurality of tray sections of different design and configuration for varying the treatment of articles transported by said conveyor means. A vibratory conveyor means having a resilient support means and drive means therefor to provide an efficient versatile material handling apparatus.

12 Claims, 8 Drawing Figures

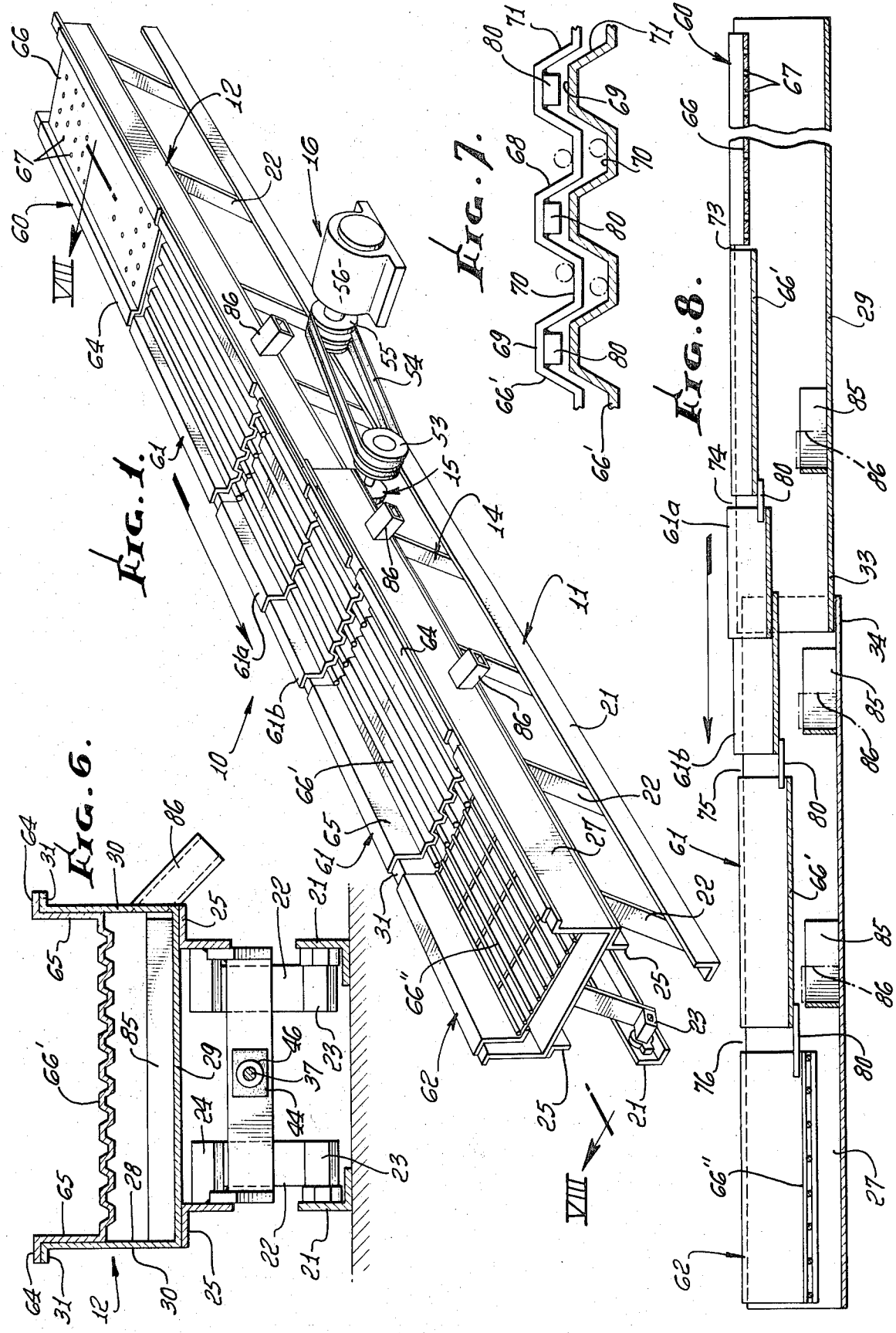

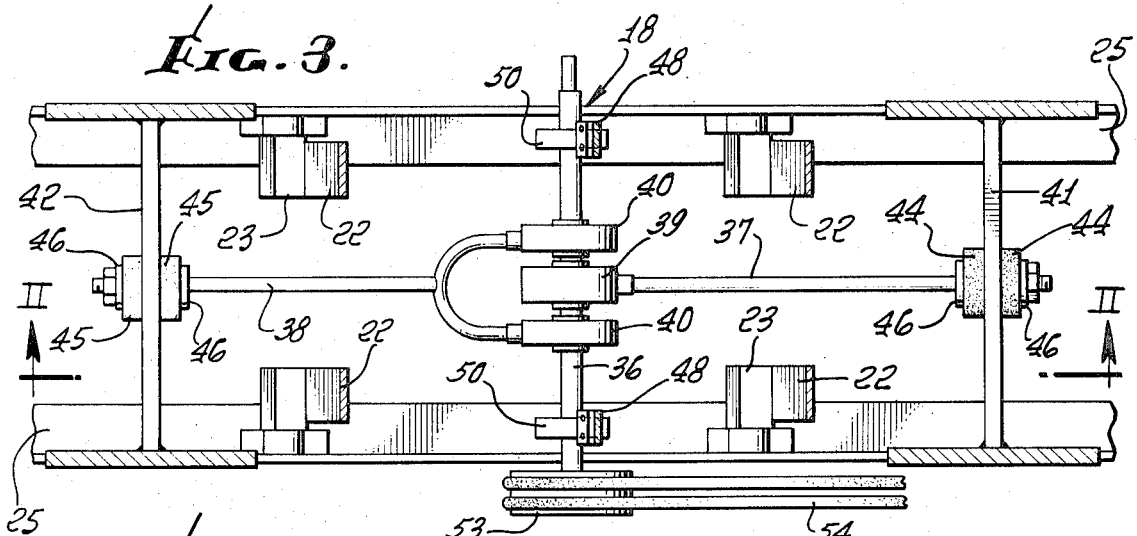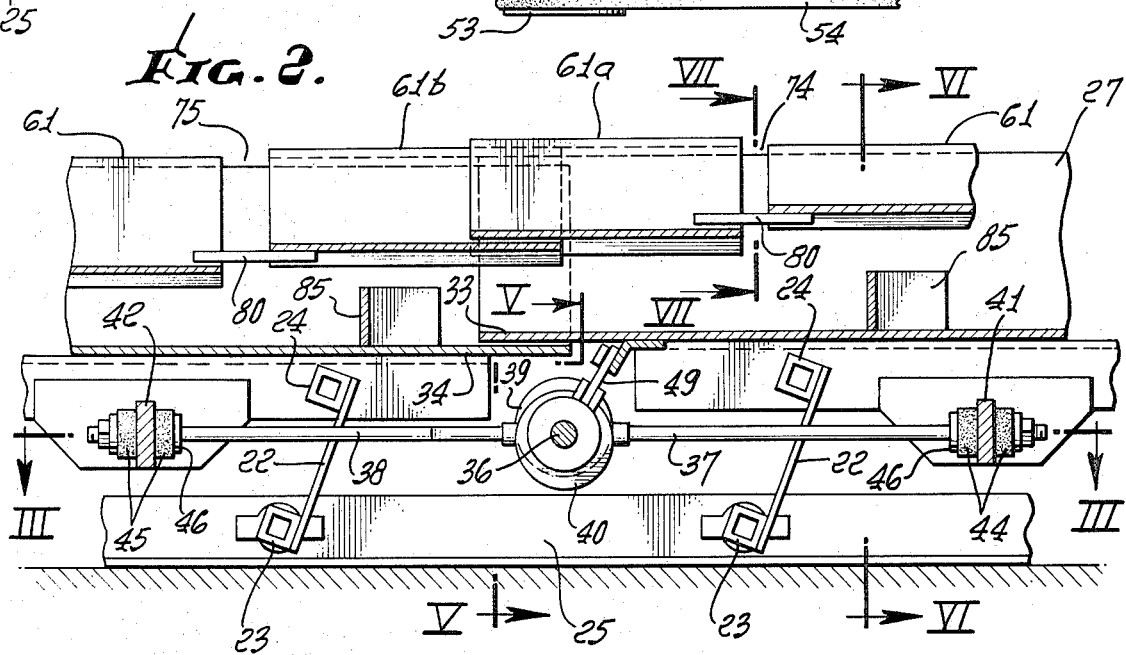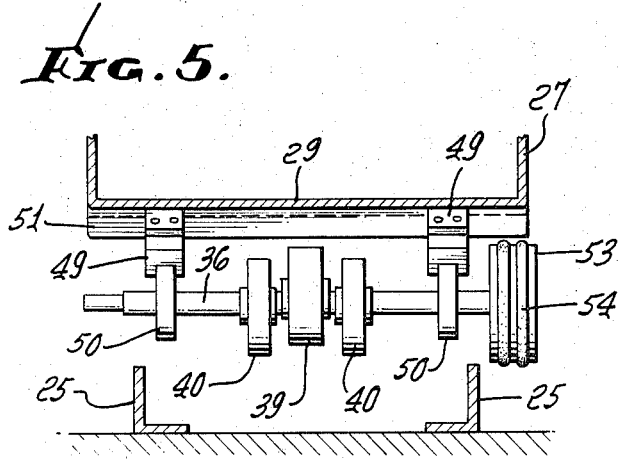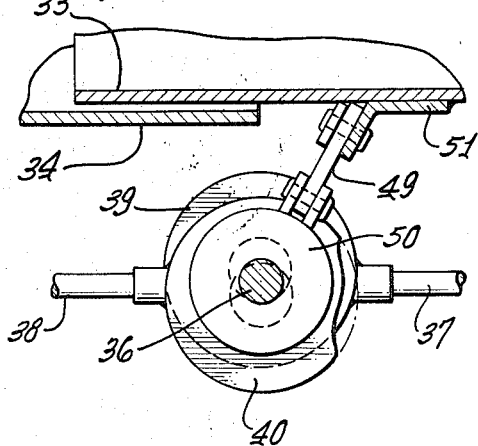

# 3,799,336

METHOD AND APPARATUS FOR TREATING DISCRETE ARTICLES

BACKGROUND OF THE INVENTION

Transport and movement of various materials from one location to another location is usually required for the purpose of treating or performing some operation on the material at one of said locations. In the processing of various types of articles or products which are in flowable discrete form and of different size and shape, a sequence of operations on the articles may be performed. For example, at one location, the articles may be washed and cleaned with selected fluids. At another location, the articles may be graded according to size which may include grading with respect to length and width. At another location separation of unwanted sizes or article parts may occur. In many prior proposed treating systems separate machines were provided at each location to perform its specific function. Transport of material from one location to another without treating of the material during such transport clearly represented time and space which was not being effectively utilized.

Vibratory conveyors of the type as shown in my U.S. Pat. Nos. 3,362,524, 3,605,996, and 3,625,346 have generally comprised two or more conveyor sections defining a path for movement of discrete flowable material along a channel-shaped deck. The conveyor sections were supported on inclined resilient leaf type members. Drive means was provided at the vicinity of adjacent ends of the conveyor sections and included a stabilized floating drive shaft provided with eccentric means which were connected by drive rods to the conveyor sections to impart vibratory motion of selected amplitude and frequency. In U.S. Pat. No. 3,362,524 certain types of grading decks were carried by the conveyor sections.

Prior proposed vibratory conveyor constructions of the type mentioned above were used generally to accomplish a specific treating operation on a product other than movement of the product from one end to the other end of the conveyor.

SUMMARY OF THE INVENTION

The present invention contemplates a vibratory conveyor means, which may include the vibratory conveyor structures mentioned above, embodying a system and apparatus for rapidly successively treating and subjecting articles and products to selected operations such as washing, dewatering, separating, grading as to length and width, and orientation of irregular shaped articles.

The present invention therefore relates to a vibratory conveyor means provided with a novel arrangement of a plurality of tray means embodying a tray construction for such selective treatment of irregular shaped articles.

An object of the present invention is to disclose and provide an apparatus for treating articles wherein vibratory motion is imparted to such articles for movement along a selected path which is provided with means for separation of such articles according to size and shape.

Another object of the present invention is to disclose and provide a novel arrangement of a plurality of trays adapted to be associated with the vibratory conveyor wherein certain of said trays are spaced apart both longitudinally and vertically to form a gap zone of selected length and width to separate articles of selected shape and size.

Another object of the present invention is to disclose and provide a novel arrangement of a plurality of tray means for separation and grading of irregularly shaped articles whereby said articles are oriented in a desired manner to facilitate such separation.

A further object of the present invention is to disclose and provide a novel apparatus and method for separating irregularly shaped articles by utilizing a vibratory conveyor means wherein means for accomplishing such separation is readily adjustable on the vibratory conveyor means.

A still further object of the present invention is to disclose and provide an apparatus as described above wherein said plurality of tray means are readily removed from the vibratory conveyor means for cleaning and washing of both the tray means and the vibratory conveyor section deck for maintaining sanitary conditions.

A still further object of the present invention is to disclose and provide a vibratory conveyor means provided with a novel tray means whereby a plurality of successive article treatment steps may be performed on the articles while being transported along the conveyor means from one location to another location.

A specific object of the present invention is to disclose and provide a novel construction of a plurality of tray means readily adapted for use on a vibratory conveyor means wherein said plurality of trays includes adjacent tray sections spaced from each other and provided with article guide means extending across said space whereby articles of predetermined shape fall through said space and other articles are transported across said space.

The invention contemplates that the form of the tray means may change and be so shaped that grading according to a desired dimension is achieved. The invention also contemplates a novel system of grading elongated articles wherein a plurality of tandem arranged trays are positioned in stepped relation to provide gap zones of both horizontal and vertical dimensions between adjacent trays and wherein means are provided at the gap zones for maintaining orientation of articles moved into or over the gap zone.

Various other objects and advantages of the present invention will be readily apparent from the following description of the drawings in which an exemplary embodiment of the invention is shown.

IN THE DRAWINGS

FIG. 1 is a perspective view of an apparatus embodying this invention, the feed end of the apparatus being at the right thereof and the discharge end at the left thereof.

FIG. 2 is an enlarged framentary sectional view taken in a vertical plane indicated by line II—II of FIG. 3.

FIG. 3 is a sectional view taken in the horizontal transverse plane indicated by line III—III of FIG. 2.

FIG. 4 is a fragmentary enlarged sectional view showing the drive shaft and its eccentric mounting, the section being taken in the same plane as FIG. 2.

FIG. 5 is a fragmentary sectional view taken in the vertical transverse plane indicated by line V—V of FIG. 2.

FIG. 6 is a fragmentary sectional view taken in the vertical transverse plane indicated by line VI—VI of FIG. 2.

FIG. 7 is an enlarged fragmentary sectional view taken in the vertical transverse plane indicated by line VII—VII of FIG. 2.

FIG. 8 is a sectional view taken in the longitudinal vertical plane indicated by line VIII—VIII of FIG. 1.

In FIG. 1 a vibratory conveyor embodying this invention is generally indicated at 10. Generally speaking, vibratory conveyor 10 comprises a base means 11, conveyor means 12 above the base means, a plurality of longitudinally spaced inclined resilient means 14 supporting the conveyor means for vibratory movement, a conveyor actuating means 15 located intermediate ends of the conveyor means 12 and a drive means 16 for the actuating means 15. Carried by the conveyor means 12 is an orienting and separating means 18 for treating articles according to at least one dimension thereof, the exemplary dimension being the length dimension of the article.

Vibratory conveyor 10, not including the orienting and separating means 18, may be any one of several vibratory conveyor apparatuses which are well known and utilized as mechanical feeders or vibrating conveyor means for continuously transporting and moving flowable discrete articles, produce, or mixed materials longitudinally along the apparatus. Examples of such vibratory conveyors are shown in my U.S. Pat. Nos. 3,362,524, 3,605,996 and 3,625,346.

The exemplary vibratory conveyor means 10 shown comprises the base means 11 having a pair of spaced parallel longitudinally extending frame members 21 of angle section. Resilient means 14 comprise a plurality of longitudinally spaced resilient leaf members 22 each connected by suitable means 23 at their lower ends to a base frame member 21 and connected at their upper ends by suitable means 24 to an angle section conveyor frame member 25.

Conveyor means 12 may comprise one or more conveyor sections 27 each of which includes conveyor frame members 25 which support thereon a conveyor channel means 28 including a longitudinally extending bottom wall 29 having longitudinal upstanding side walls 30 provided with outturned top flanges 31. The upstream conveyor section 27 has a discharge end portion 33 which longitudinally overlaps the feed end portion 34 of the downstream conveyor section 27.

The resilient members 22 are inclined upstream at a selected angle and are provided with predetermined resilient characteristics depending upon the weight of the conveyor sections and the loads to be imposed upon the conveyor sections during vibratory movement thereof. In this example, the resilient means 14 are shown as individual resilient members 22 extending from each base frame member 21 to the conveyor frame member 25 so that a precise selected number of resilient means may be utilized in the resilient support of the conveyor section. Thus depending upon the conditions mentioned above, it may be desirable to add or subtract resilient members 22 in order to achieve desired operation of the conveyor means.

Actuating means 18 in this example includes a transverse shaft 36 located beneath the overlapping adjacent conveyor end portions 33, 34 and supported in a floating manner by longitundially extending actuating rods 37 and 38. Each rod 37 and 38 is connected by eccentric means 39 and 40 respectively to shaft 36 in such a manner that the rods 37, 38 lie in approximately the same horizontal plane and in diametric opposition with respect to shaft 36. The other ends of actuating rods 37 and 38 are connected to transverse frame members 41 and 42 respectively of the conveyor sections 27. The end of each rod 37, 38 extends through an opening in the transverse members and on opposite sides of each member 41, 42 are provided resilient cushioning or shock absorbing material 44, 45, each rod 37, 38 being provided with enlarged annular pressure discs 46 on oppositely directed faces of the cushioning material 44,45 so that vibratory forces imparted to the conveyor section through the actuating rod 37 will be transmitted through the cushioning material 44,45.

Shaft 36 may be further floatingly supported by stabilizing means 48 located adjacent opposite ends of shaft 36. Stabilizing means 48 includes a flexible resilient leaf member 49 connected at one end by a collar 50 to shaft 36 and at its other end to a angular bracket 51 secured to conveyor section 27.

One end of shaft 36 may be extended beyond the side of the conveyor sections 37 for mounting thereon of a drive pulley 53 which is connected through a belt means 54 to a motor shaft pulley 55 driven by a suitable motor means 56 which may be mounted upon a floor supporting the base frame 11. It will be apparent that shaft 36 is resiliently and floatingly supported by the above described construction since there is no direct connection to the supporting surface, the flexible connections being made through the resilient support means 14, the stabilizing means 18 and the pulley means 54.

Separating and orienting means 18 which comprise the present invention include a plurality of tray members of selected type. In this example three types of tray members are shown, namely tray members 60, 61 and 62. Each of the tray members 60, 61 and 62 includes means for adjustably attaching the tray members to conveyor sections 27 such means comprising longitudinally extending flanges 64 on opposite sides of each tray member and resting upon flanges 31 of the side walls 30 of the conveyor sections 27. Each tray member 60, 61, 62 may be readily moved longitudinally on the conveyor sections to a selected position as later described.

Each tray member 60, 61, 62 includes side walls 65 which extend downwardly alongside side walls 30 of the conveyor section and support the transversely extending tray bottom wall 66. The shape and configuration of the tray bottom wall 66, and since three types of trays are shown, also tray bottom walls 66' and 66", depend upon the treatment to which the material is to be subjected. In this example tray 60 is provided with a bottom wall 66 having a plurality of perforations 67 therein. The size and number of such perforations depends upon the treatment to be given to the articles or material being fed to tray member 60. Since this tray is located at the feed end of the conveyor means, tray member 60 with the perforated bottom wall 66 may be used to wash produce fed thereto by subjecting the material to water spray from an overhead water system (not shown). Such water spray may be directed at the material by suitable nozzles longitudinally aligned with the apparatus so that initial longitudinal alignment of elongated articles or material may be commenced.

Similarly if the material or articles being treated is conveyed by means of a fluid such as water to the feed end of the apparatus, the perforated bottom wall 66 of tray member 60 may serve to dewater the articles or material in rapid fashion since the water will pass through the perforations. Similarly, if the material includes a large number of fines, the feeding of the material with fines to a tray member such as 60 while the apparatus is vibrating will cause rapid separation of the fines from the material, the fines passing through the perforations 67.

Tray members 61 are each of similar construction except for the height of the tray walls 65. Tray walls 65 are varied in height to provide a plurality of tray members 61 with vertically spaced or stepped bottom walls 66'. In this example, bottom walls 66' include longitudinally extending corrugations of selected height and width depending upon the articles and produce being treated. Thus as elongated articles for example are discharged from the perforated bottom wall 66 of tray member 60 onto the first tray member 61, such articles will begin to align themselves longitudinally by the action of the inclined sides 68 extending between the crests 69 and valleys 70 of the corrugations 71 formed in the bottom wall 66' of the tray members 61.

In this example, tray portions 61a and 61b located at the overlapping ends of the conveyor sections 27 also overlap in corresponding manner and without a gap or fingers. Tray portions 61a, 61b provide a tray member 61.

At the passing zone between tray member 60 and the first tray member 61, it will be apparent from FIG. 8 that the space or gap 73 is relatively small and insufficient to permit passage therethrough of the articles to be oriented or separated.

Between each of the tray members 61 and the last of tray members 61 and tray member 62, gap zones 74, 75 and 76 are provided for causing separation of articles or material passing from one tray to the other tray member. Each of gap zones 74, 75 and 76 is defined by longitudinally spacing adjacent end edges of the adjacent tray members a preselected distance to obtain the desired size or grade of the article. The longitudinal space at gap zones 74, 75 and 76 is progressively increased so that the narrowest gap is at zone 74 and the widest at zone 76. Thus, small or short articles may pass through the gap zone 74 and longer articles moved along the path of the tray members to be dropped through gap zone 75 and 76 in accordance with their length.

Gap zones 74, 75 and 76 also include a vertical dimension which is provided by the progressive increase in height of walls 65 of the tray members 61 and 62. The vertical height of the gap zone may be generally uniform between tray members, an example of such vertical height being one inch. In the separation of certain articles it may be desirable to progressively increase the vertical height of the gap zone as measured between adjacent end edges of adjacent tray members 61.

It will be noted that the corrugations 71 in the bottom walls 66' of the tray member 61 serve to longitudinally align the articles being moved along the conveyor means by vibratory impulses imparted thereto by the vibratory actuating means 15 and its drive means 16. Means are provided to maintain such longitudinal orientation as an article enters the gap zone to provide more precise separation and grading and to avoid non-oriented position of the articles as they are transferred from one tray member to the other. Such gap zone orienting means comprises longitudinally extending guide fingers 80 secured as by welding beneath each crest 69 of corrugation 71 and extending over the longitudinally aligned crest of the corresponding corrugation on the adjacent downstream tray member. Elongated articles traveling down valley 70 are thus prevented from becoming longitudinally misaligned at the gap zone and will pass over the gap zone and move down the corresponding valley of the adjacent tray member. It will be apparent that the guide fingers 80 by thus limiting misalignment of articles also causes the articles to be more precisely separated in accordance with the longitudinal width of the gap zone provided between tray members. Any misalignment or angular cocking of an elongated article at the gap zone might permit an overlength article to pass through the gap zone, and thus the grading or separation would not be as precise.

At tray member 62 a further process step or treatment may be performed on the material being separated and graded. Tray member 62 may include a bottom wall 66'' formed of a selected wire mesh having elongated openings of selected width. Articles passing over gap zone 76 and onto the wire mesh bottom wall 66' of tray member 62 will be only those articles of oversize length as determined by the length of the prior gap zones. In the event the dimension of such articles is critical, the width of the wire mesh openings and length thereof may perform a further separation step by passing through bottom wall 66' all of such articles less than a selected width. Articles not passed through bottom wall 66' will be discharged over the end of the conveyor as tailings into suitable means for transport to a storage or disposal site. It will be understood that bottom wall 66'' of tray member 62 may perform any other function desired with respect to sizing, grading, etc. as for example bottom wall 66' may be simply a flat wall to discharge the over size or over length articles as tailings.

Articles which are dropped through the successive stepped gap zones 74–76 inclusive fall upon the bottom wall 29 of the conveyor section. Such separated articles are prevented from commingling with separated articles downstream on the conveyor sections by means of angularly disposed deflector walls 85 which lead the articles to openings 86 in the side wall 30 of the conveyor sections for discharge into suitable bins or on to suitable conveyors in accordance with their size.

Gap zones 73–76 may be varied in length by simply sliding each tray member relative to the adjacent tray member until the desired width of gap zone is obtained. Tray members 60, 61 and 62 may be simply secured on the flanges 31 of the conveyor sections by friction clamps, nut and bolt assemblies extending through slots in the flanges 64 and 31 or any other suitable securement means for adjustably positioning and securing the tray members to the conveyor sections.

Thus it will be readily apparent that the above described apparatus may be readily equipped with tray members of different type in order to provide successive processing of articles as cleaning and washing, separating wanted from unwanted articles or parts of articles, separating according to length or some other dimension, and screening for classifying by size. Articles or material capable of being handled by the vibrating apparatus and orienting and separating means of this invention may include a wide variety of produce and food products including string beans, separation of nubbins and slivers from potatoes prepared for making french fries, asparagus, okra, and other elongated articles which may be mixed with other unwanted material such as fines and the like.

Tray members 60, 61 and 62 may preferably be made of suitable light weight metal material for convenient handling and readily removable from the conveyor section for cleaning, resurfacing, scouring, or subjecting to sanitary treatment if necessary and then readily replaceable. The gap zones 73–76 inclusive may be selectively varied from 0 to 6 inches and the vertical spacing between the planes of the bottom walls of the tray members may be approximately 1 inch.

It will be understood that the exemplary conveyor means includes two conveyor sections, however the separating and orienting means 18 of this invention may be mounted on a single vibratory conveyor section driven in well known manner. Depending upon the material or articles to be treated, the vibratory conveyor 10 may be subjected to a relatively violent vibratory action to accomplish coarse grading and separation of certain materials and may also be regulated to provide minimal vibratory action to provide a very refined selective grading or separation of the articles.

It will further be understood that while longitudinally extending fingers or elements project from the upstream tray member over the gap zone and over an adjacent portion of the upper end of the downstream tray member, that such guide fingers or means for restricting lateral movement of articles being conveyed in oriented fashion may be varied in both lateral and vertical dimension to provide an effective maintenance of orientation of the articles being treated. While the example has been concerned with elongated articles, it will be understood that articles of other shape may be selectively separated and graded according to one or more of their dimensions.

Various modifications and changes may be made in the apparatus described above and all such modifications and changes coming within the scope of the appended claims are embraced thereby.

I claim:

1. In a vibratory conveyor including a conveyor section with a bottom wall, resilient means supporting said conveyor section, and drive means for imparting vibrations to said conveyor section and including a drive shaft supported from the conveyor section and a stabilizer arm for the drive shaft, the combination therewith of:
    means carried by said conveyor section above said bottom wall for conveying and treating discrete articles and including
    means for orienting said articles longitudinally with respect to the conveyor section,
    said orienting means including orienting trays spaced from said bottom wall and positioned across said conveyor section,
    adjacent orienting tray portions being spaced longitudinally and vertically relative to each other to provide a longitudinally extending gap zone of selected length,
    and finger means extending over said gap zone to maintain orientation of oriented articles being transferred from one tray portion to another tray portion, oriented articles of selected length falling through said gap zone for travel along said bottom wall of the conveyor section to a selected discharge point.

2. In a conveyor as stated in claim 1 including tray means having perforations therein on said conveyor section for removal of unwanted substances mixed with said oriented articles.

3. In a conveyor as stated in claim 1 including means for separating oriented articles in accordance with their width.

4. Means for separating articles according to at least one dimension and including vibratory conveyor means to move said articles along a path, comprising:
    a plurality of tray members arranged in tandem relation to define a pathway;
    certain of said trays having a bottom wall provided with means for longitudinally orienting an article;
    said bottom wall including longitudinal corrugations;
    adjacent transverse edges of bottom walls of adjacent trays being spaced longitudinally and vertically selected distances;
    and means extending from the edge portion of the uppermost tray over the space between said trays and over the adjacent edge of the lowermost tray to laterally restrict movement of articles being separated at the gap between said trays.

5. Means for separating articles according to at least one dimension and including vibratory conveyor means to move said articles along a path, comprising:
    a plurality of tray members arranged in tandem relation to define a pathway;
    certain of said trays having a bottom wall provided with means for longitudinally orienting an article;
    said bottom wall including mesh-like openings of selected width and length;
    adjacent transverse edges of bottom walls of adjacent trays being spaced longitudinally and vertically selected distances;
    and means extending from the edge portion of the uppermost tray over the space between said trays and over the adjacent edge of the lowermost tray to laterally restrict movement of articles being separated at the gap between said trays.

6. Means for separating articles according to at least one dimension and including vibratory conveyor means to move said articles along a path, comprising:
    a plurality of tray members arranged in tandem relation to define a pathway;
    certain of said trays having a bottom wall provided with means for longitudinally orienting an article;
    adjacent transverse edges of bottom walls of adjacent trays being spaced longitudinally and vertically selected distances;
    and means extending from the edge portion of the uppermost tray over the space between said trays and over the adjacent edge of the lowermost tray to laterally restrict movement of articles being separated at the gap between said trays.

7. In a means as stated in claim 6 including longitudinal support means on said conveyor means for said tray members; and means for adjustably slidably mounting said tray members on said longitudinaly support means to vary the length of the space between adjacent end portions of said tray members.

8. In a means as stated in claim 6 wherein
said means for longitudinally orienting articles on said bottom wall includes longitudinally extending parallel crests and valleys;
and wherein said laterally restricting means includes longitudinal elements extending from the crest on one tray to the corresponding crest on an adjacent tray.

9. In a means as stated in claim 7 wherein said plurality of trays have side walls of progressively increasing height to vary the vertical height of the gap between adjacent end portions of said tray members.

10. In a means as stated in claim 9 including
securement means for releasably retaining said trays on said longitudinal support means in adjusted relation.

11. In a method of separating a random mixture of articles in accordance with at least one of their dimensions as the articles travel along a pathway, comprising the steps of:
feeding the random mixture of said articles to one end of said pathway for movement therealong;
directing streams of fluid against said articles to orient said dimension of the article parallel to the direction of movement along said pathway,
moving said articles while in such orientation into a plurality of spaced stepped gap zones in said pathway whereby articles having a selected dimension span certain of said gap zones for continuation of said movement along said pathway and whereby articles having a lesser dimension fall through other of said gap zones and are separated from other articles, and
restricting lateral misalignment of said articles from their orientation according to said dimension while in said gap zone.

12. In a method as stated in claim 11 including the step of separating articles oriented in accordance with said one dimension in accordance with a second dimension.

* * * * *